(12) United States Patent
Akbari et al.

(10) Patent No.: US 8,830,124 B1
(45) Date of Patent: Sep. 9, 2014

(54) SYSTEM AND METHOD FOR ASSET TRACKING CONFIGURATION OF A MOBILE TERMINAL

(75) Inventors: Homaira Akbari, Washington, DC (US); Craig Malone, Lansdowne, VA (US); Mike Walgren, Chantilly, VA (US)

(73) Assignee: SkyBitz, Inc., Herndon, VA (US)

( * ) Notice: Subject to any disclaimer, the term of this patent is extended or adjusted under 35 U.S.C. 154(b) by 238 days.

(21) Appl. No.: 13/235,641

(22) Filed: Sep. 19, 2011

Related U.S. Application Data

(60) Provisional application No. 61/384,135, filed on Sep. 17, 2010.

(51) Int. Cl.
*G01S 19/34* (2010.01)
*G01S 19/43* (2010.01)
*G01S 19/24* (2010.01)

(52) U.S. Cl.
USPC ............ 342/357.74; 342/357.26; 342/357.63

(58) Field of Classification Search
USPC ............ 342/357.26, 357.34, 357.63, 357.74, 342/457; 701/468, 469; 340/539.13
See application file for complete search history.

(56) References Cited

U.S. PATENT DOCUMENTS

| | | | | |
|---|---|---|---|---|
| 5,752,218 | A | * | 5/1998 | Harrison et al. ............... 701/485 |
| 2007/0229350 | A1 | * | 10/2007 | Scalisi et al. .................. 342/350 |
| 2009/0315767 | A1 | * | 12/2009 | Scalisi et al. ............. 342/357.07 |
| 2010/0017126 | A1 | * | 1/2010 | Holcman et al. ............... 701/300 |
| 2013/0063304 | A1 | * | 3/2013 | O'Regan et al. ......... 342/357.55 |

\* cited by examiner

*Primary Examiner* — Dao Phan
(74) *Attorney, Agent, or Firm* — Duane S. Kobayashi

(57) ABSTRACT

A system and method for asset tracking configuration of a mobile terminal. A mobile terminal can be designed to enable a remote determination of an asset position. In one embodiment, the mobile terminal can include a configured function that enables the mobile terminal to reconfigure mobile terminal operation (e.g., activation of a GPS engine).

18 Claims, 3 Drawing Sheets

SYSTEM AND METHOD FOR ASSET TRACKING CONFIGURATION OF A MOBILE TERMINAL

This application claims priority to provisional patent application No. 61/384,135, filed Sep. 17, 2010, which is incorporated by reference herein, in its entirety, for all purposes.

BACKGROUND

1. Field of the Invention

The present invention relates generally to tracking and monitoring and, more particularly, to a system and method for asset tracking configuration of a mobile terminal.

2. Introduction

Tracking mobile assets represents a growing enterprise as the need for increased visibility into the status of movable assets (e.g., trailers, containers, etc.) increases. Visibility into the status of movable assets can be gained through mobile terminals that are affixed to the assets. These mobile terminals can be designed to generate position information that can be used to update status reports.

In one conventional tracking system, the mobile terminal is affixed to the roof of the trailer. This location of attachment ensures that the satellite receiver in the mobile terminal maintains good visibility throughout the transport route. One of the challenges of such a mobile terminal installation is the powering of the mobile terminal. In one scenario, the mobile terminal can be powered by a battery. The service life of such a battery is dictated by the amount of power required by the mobile terminal in executing various tracking functions. The battery service life also dictates the associated maintenance costs, which would be required to service mobile terminals having depleted batteries.

What is needed therefore is a mechanism that maximizes the functionality of mobile terminals, while minimizing the impact on various constraining factors.

SUMMARY

A system and method for asset tracking configuration of a mobile terminal, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
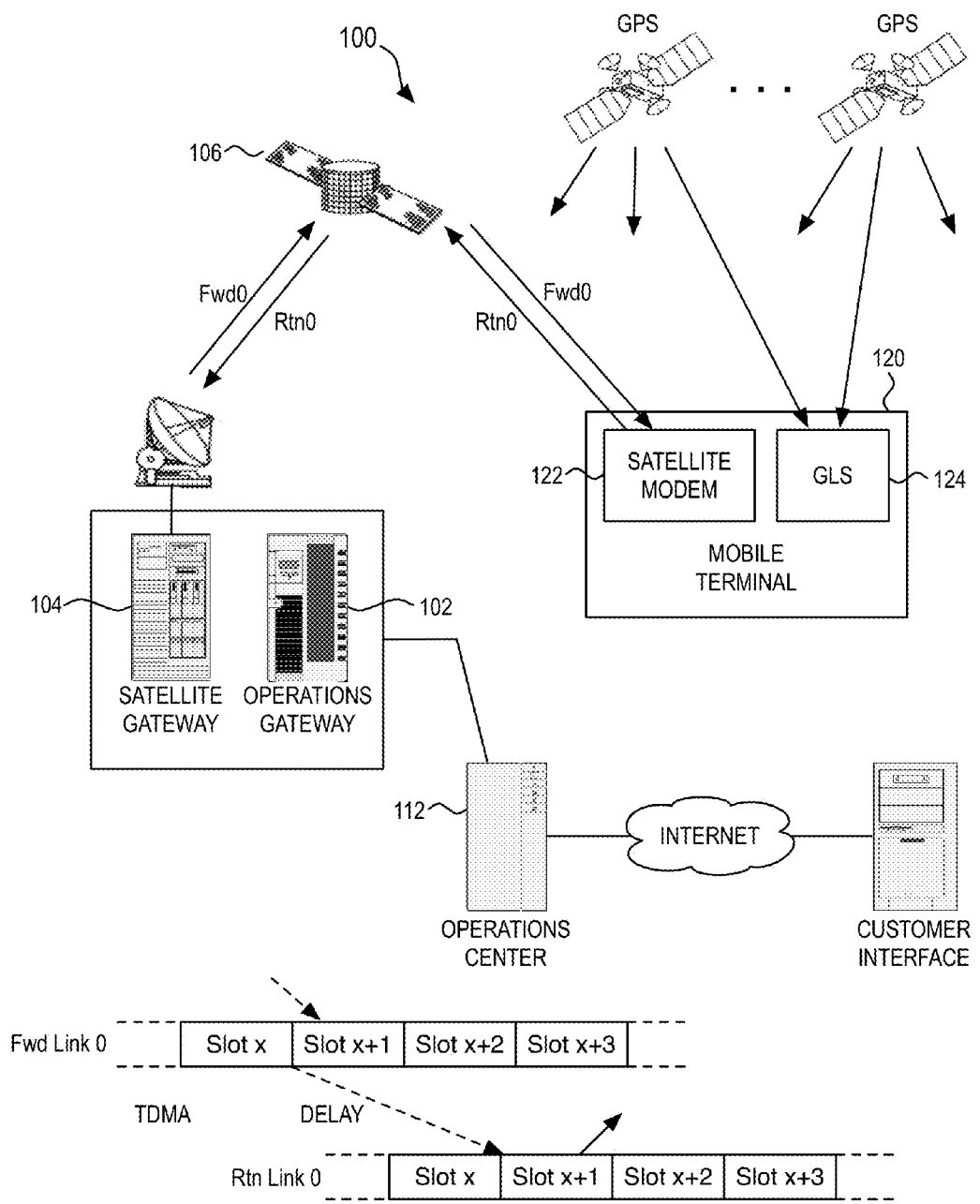
FIG. 1 illustrates an embodiment of a satellite network in communication with a mobile terminal on an asset.

FIG. 1 illustrates an embodiment of an asset tracking system that includes operations gateway 102, communicating with mobile terminal 120, which is affixed to an asset. As would be appreciated, the asset can be embodied in various forms such as a truck, trailer, railcar, shipping container, or any other item of interest.

Communication between operations gateway 102 and mobile terminal 120 is facilitated by satellite gateway 104 at the ground station and satellite modem 122 in mobile terminal 120. Both satellite gateway 104 and satellite modem 122 facilitate communication over communication satellite 106.

In one embodiment, the satellite communication is implemented in a time division multiple access (TDMA) structure, which consists of 57600 time slots each day, per frequency or link, where each slot is 1.5 seconds long. On the forward link, operations gateway 102 sends a message or packet to mobile terminal 120 on one of the 1.5 second slots. Upon receipt of this message or packet, mobile terminal 120 would then perform a GPS collection (e.g., code phase measurements) using global locating system (GLS) module 124 and/or to perform sensor measurements and transmit the data back to operations gateway 102 on the return link, on the same slot, delayed by a fixed time defined by the network. In one embodiment, the fixed delay defines a length of time that enables mobile terminal 120 to decode the forward packet, perform the data collection and processing, and build and transmit the return packet.

In one embodiment, mobile terminal 120 can be configured to produce periodic status reports. In this configuration, mobile terminal 120 would wake up periodically, search for its assigned forward slot, perform GPS and sensor data collection and processing, and transmit the status report on the assigned return slot. In another embodiment, mobile terminal 120 can be configured to produce a status report upon an occurrence of an event (e.g., door opening, motion detected, sensor reading, etc.). In this configuration, mobile terminal 120 would wake up upon occurrence of an event, search for an available forward slot, perform GPS and sensor data collection and processing, and transmit the status report on the return slot corresponding to the identified available forward slot.

Upon receipt of a status report from mobile terminal 120, operations gateway 102 passes the information to operations center 112. Operations center 112 can then use the received GPS collection to calculate a position solution. This position solution along with any other status information (both current and historical) can be passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety.

In another embodiment, mobile terminal 120 can be configured to transmit status reports to a low earth orbit (LEO) satellite. An example of such a communication process is described in co-pending non-provisional patent application Ser. No. 13/078,453, entitled "System and Method for Position Determination Using Low Earth Orbit Satellites," which is incorporated herein by reference in its entirety. As will become apparent from the following description, the principles of the present invention are not dependent on the use of a particular type of communication satellite.

In one embodiment, mobile terminal 120 can also collect sensor measurements from sensors (not shown) that are positioned at various points on the asset being tracked. In meeting the demand for greater visibility into the status of assets, various sensor types can be used. For example, volume sensors, temperature sensors, chemical sensors, radiation sensors, weight sensors, light sensors, water sensors, RFID tags, etc. can be used to report the condition of cargo being transported or an environment of the asset. In other examples, truck cab ID indicators, odometer sensors, wheel sensors, vibration sensors, etc. can be used to report the condition of an asset transporter.

In general, the various sensors can be used to report status information or the occurrence of any events that can be associated with the asset to which the mobile terminal is affixed. The sensor information along with position information can be reported to the centralized facility periodically, upon request, or upon an occurrence of a detected event at the asset location. In various embodiments, the transmission of sensor information from the sensors to mobile terminal 120 can be facilitated by wired or wireless connections.

Figure 2:
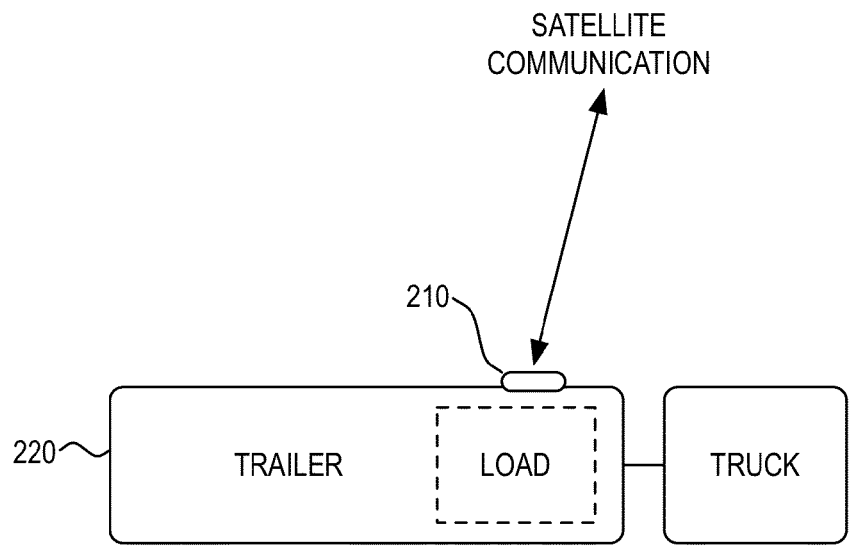
FIG. 2 illustrates a mobile terminal affixed to an asset.

Mobile terminals are often affixed to an asset at a location that facilitates good visibility to the satellites. FIG. 2 illustrates one example of mobile terminal placement on an asset such as trailer, which contains a load. In this illustrated example, mobile terminal 210 is affixed to a roof of trailer 220, which is pulled by a truck. At this roof position, the view of mobile terminal 210 to the various satellites is largely unobstructed. This unobstructed view enables mobile terminal 210 to maintain communications contact with the various satellites as it is routed to its destination.

To facilitate placement of a mobile terminal on various parts of an asset, the mobile terminal can be designed to operate using battery power. The effectiveness of this battery-powered solution is based on the battery lifetime. The greater the battery lifetime, the lower the maintenance costs in servicing the installed base of mobile terminals. One of the key factors in extending the battery life is minimizing the power demand of the mobile terminal.

As described above, the GLS module is designed to take GPS measurements and forward those GPS measurements to the operations center. In this GLS solution, the location of the asset is not determined at the mobile terminal. Rather, the location of the asset is determined at a remote operations center using the GPS measurements that have been forwarded by the mobile terminal. By this process, the power drain at the mobile terminal is minimized as the mobile terminal can be in an awakened state for a short period of time that is sufficient to collect and forward the GPS measurements to the operations center.

Figure 3:
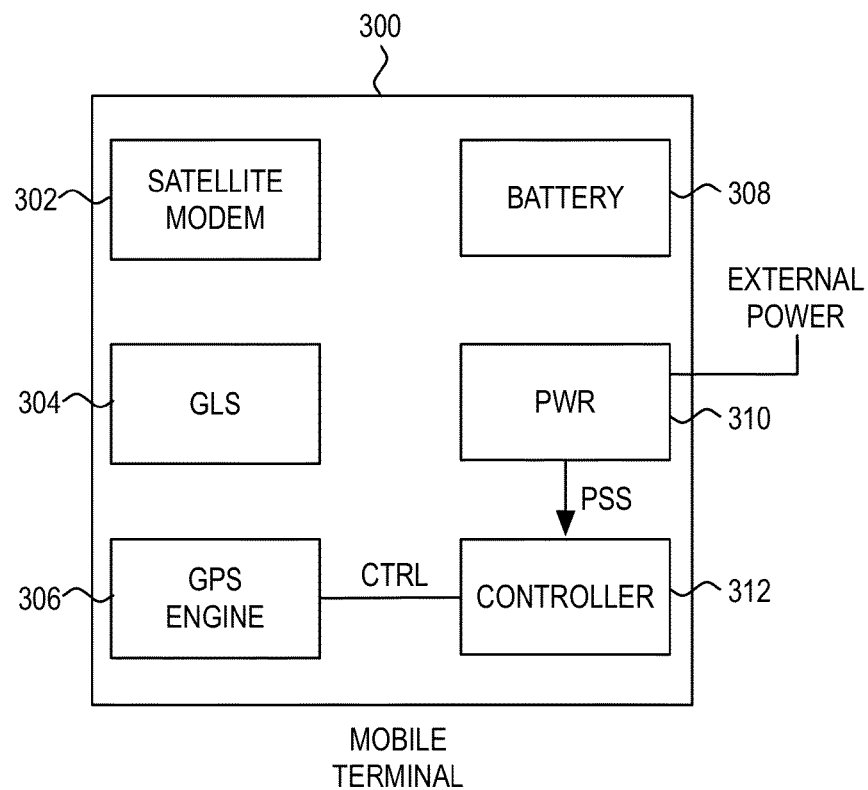
FIG. 3 illustrates a mobile terminal coupled to external power.

FIG. 3 illustrates an embodiment of a configurable mobile terminal according to the present invention. As illustrated mobile terminal 300 includes satellite modem 302 and GLS module 304 to perform the collection and forwarding of GPS measurements to the remote operations center.

In addition, mobile terminal 300 also includes GPS engine 306. GPS engine 306 is generally designed to perform a GPS position determination locally at mobile asset 300. One of the disadvantages of including GPS engine 306 in mobile terminal 300 is the substantial power requirements demanded by GPS engine 306. More specifically, the power required to enable GPS engine 306 to determine its position multiple times per day would drastically reduce the life expectancy of battery 308 in mobile terminal 300. This drastically reduced life expectancy would produce a corresponding increase in the associated mobile terminal maintenance costs to unsustainable levels.

It is a feature of the present invention that the inclusion of GPS engine 306 in mobile terminal 300 can be supported through configurable functionality included within mobile terminal 300. In the above example, the configurable functionality can be implemented through a configured function that is dependent on an input such as available power.

In one embodiment, the configurable functionality is based on an input such as the availability of external power. As illustrated in FIG. 3, external power can be received at power module 310. As would be appreciated, the external power can be provided by various methods depending on the type of asset to which the mobile terminal is affixed. For example, if the mobile terminal is affixed to a trailer, then the external power can be provided through a 7-way trailer connector when the truck is connected.

In the example embodiment of FIG. 3, the receipt of external power at power module 310 of the mobile terminal can be used to generate a power supply status (PSS) signal that is provided to controller 312. This PSS signal provides an indication to controller 312 that external power is available. The availability of external power to the mobile terminal, thereby indicates that the mobile terminal is not constrained by the power in battery 308. This lack of constraint of the power available to the mobile terminal would then enable controller 312 to activate GPS engine 306. In contrast, controller 312 would limit activation of GPS engine 306 if the power-based cost function indicated that the available pool of power would not justify the activation of GPS engine 306.

As would be appreciated, FIG. 3 illustrates a simple embodiment where the power-based cost function can be based on the existence or non-existence of external power to the mobile terminal. More generally, the power-based cost function can be based on other advanced metrics that can consider power budgets based on internal battery 308. For example, the power-based cost function can be based on the battery power level, the power consumed in a given time period, the priority of a function enabled by GPS engine 306 (e.g., user override), or any other metric that measures the relative value of power to be consumed by GPS engine 306. Even further, the power-based cost function need not be based on a locally-generated signal. In one embodiment, the PSS can represent a remotely generated signal that is sent over a communication network. This remotely-generated signal can be based on remote monitoring of mobile terminal power, customer control, etc.

In general, the control of the activation of GPS engine 306 by controller 312 can be designed to maximize functionality of the mobile terminal relative to the availability of power to the mobile terminal. This control can be designed to meet the changing power environment in which the mobile terminal operates. For example, the mobile terminal can activate/de-activate GPS engine 306 to match the changing power environment in an intermodal transfer where an asset is being transported by different transportation segments based on truck, rail and ship transport. In another example, the mobile terminal can activate/de-activate GPS engine 306 to match a change in power environment due to failure conditions (e.g., fuse failure in a 7-way power scenario). In a further example, the mobile terminal can activate/de-activate GPS engine 306 to match the operating condition of the asset (e.g., construction equipment running versus idle).

In yet another example, the mobile terminal can enable or cancel a GPS position query based on a time needed for such a GPS position query. In general, GPS engine 306 would typically need 30 seconds to download ephemeris information periodically. If the current ephemeris information is already available to GPS engine 306, then a position query could take less than a second to arrive at a position fix. In this scenario, the power-based cost function can therefore activate/de-activate GPS engine 306 based on the expected power to be consumed by the GPS query.

GPS engine 306 can be designed to enable various on-board functions at mobile terminal. As would be appreciated, the principles of the present invention are not dependent on a particular GPS function implemented. In various examples, the functions enabled by GPS engine 306 can support on-board and remote implementations of virtual perimeter initiated tracking and actions, on-board and remote calculation of mileage for trips, directional indications, movement detection, etc.

Figure 4:
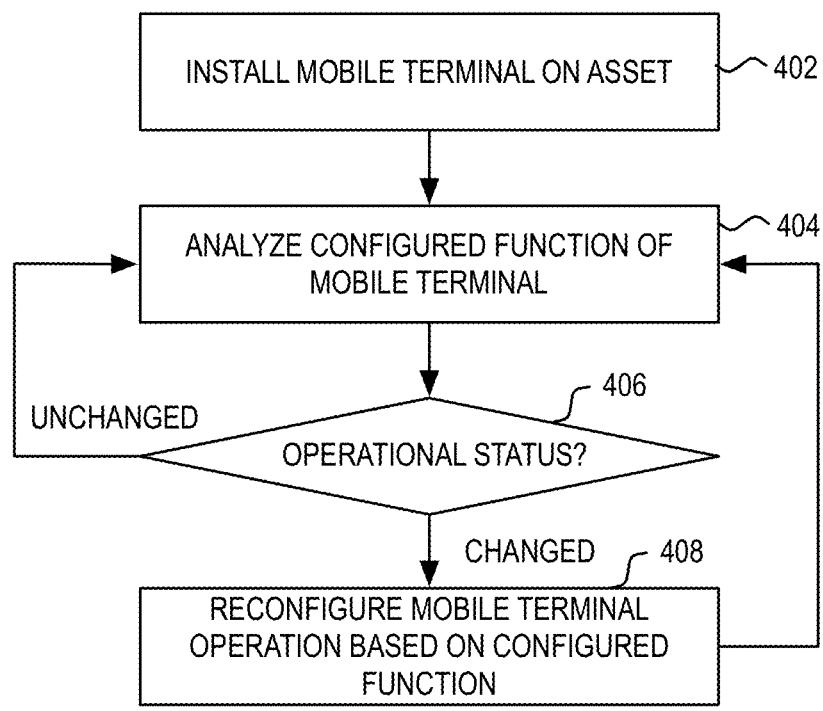
FIG. 4 illustrates a flowchart of a process for enabling asset tracking configuration of a mobile terminal.

To further illustrate the operation of a configurable function of a mobile terminal, reference is now made to the flowchart of FIG. 4. As illustrated, the process begins at step 402 where a mobile terminal is installed on an asset. Next, at step 404, the mobile terminal would analyze the configured function (e.g., power-based cost function) of the mobile terminal. As noted above, the specific form and input variables of the configured function would be implementation dependent. Based on the analysis of the configured function, the mobile terminal would then determine an operational status (e.g., GPS engine status) at step 406. If it is determined, at step 406, that the operational status of the mobile terminal should remain unchanged (e.g., GPS engine inactive), then analysis of the configured function would continue at step 404.

If, on the other hand, it is determined, at step 406, that the operational status should change, then the mobile terminal would be reconfigured in accordance with the configured function. For example, the GPS engine could be activated by the controller and the relevant GPS functions enabled by the active GPS engine would commence at step 408. The analysis of the configured function would then continue at step 404 to determine whether any further changes in operational status of the mobile terminal should be effected.

As has been described, a mobile terminal's operation can be configured based on an analysis of a configured function implemented by the mobile terminal. In the example above, operation of a GPS engine is based on an analysis of a configured power-based cost function implemented by the mobile terminal.

More generally, the analysis of a configured function implemented by the mobile terminal can be applied to other use scenarios. In one use scenario, the configured function can dictate the reporting interval (e.g., every X minutes, every Y hours, every Z days, etc.) of the mobile terminal. Here, variations in the reporting interval can be dictated based on an analysis of the configured function implemented by the mobile terminal. For example, the reporting interval can be changed based on a power-based cost function. Here, the control of the reporting interval can be designed to maximize asset visibility relative to the availability of power to the mobile terminal. In other words, the control of the reporting interval can be designed to meet the changing power environment in which the mobile terminal operates.

In another use scenario, the reporting interval, communication data rate, or message type priority can be changed based on a geographic cost function. For example, the reporting interval, communication data rate, or message type priority could be altered based on a particular geographic area in which the mobile terminal is operating. An application of such a use scenario is a restricted geographic area application where transmissions in certain geographic areas are at risk due to potential security risks presented by the mobile terminal transmissions. In this scenario, the mobile terminal can be configured to alter the reporting interval, the communication rate, message type priority, etc. in response to the geographic restriction. While under these geographic restrictions, the mobile terminal can continue to accumulate sensor data, and would wait until the geographic cost function indicates that the regular reporting by the mobile terminal can commence.

In one embodiment, the identification of a geographic area in which a mobile terminal is operating is based on measurements of positioning satellites such as GPS satellites. As would be appreciated, an identification of a geographic area can be based on a variety of signals (e.g., a signal beacon) that may or may not provide an indication of an exact geographic location.

In yet another use scenario, a billing rate can be changed based on a geographic cost function. For example, the billing rate associated with the asset on which the mobile terminal is affixed can be adjusted based on a particular geographic area in which the mobile terminal is operating. An example application of such a use scenario is location-based billing where the billing rate associated with the asset can be adjusted when the asset crosses an international border or other geographic demarcation. Similarly, the billing rate can be changed based on a configured function that tracks a reporting interval, communication rate or type of communication from the mobile terminal. This enables certain communications intervals, rates, types, etc. to be billed at premium levels.

In one embodiment, the configured function implemented by the mobile terminal can be established via over-the-air configuration parameters. This enables the mobile terminals in the field to be configured remotely in implementing specific configured functions.

In the above description of an example embodiment, a communication satellite (e.g., GEO, MEO, LEO) can be used to transmit positioning information, sensor measurement, alert information, etc. to a remote operations center. The principles of the present invention are not confined to such a transmission mechanism. In other embodiments, the communication link between the mobile terminal and the remote operations center can be facilitated by a terrestrial cellular network, a short range radio network, or any other communication network that can provide a suitable communication path.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A mobile terminal that enables asset tracking, comprising:
    a first position tracking module that collects measurements from a plurality of positioning satellites, said collected measurements being obtained for forwarding by said mobile terminal to a remote operations center for determination of a position of said mobile terminal;
    a second position tracking module that determines a position of said mobile terminal locally at said mobile terminal; and
    a controller that controls an activation of said second position tracking module based on an analysis of power availability or consumption by said mobile terminal.

2. The mobile terminal of claim 1, wherein said first position tracking module forwards collected GPS code phase measurements to the remote operations center.

3. The mobile terminal of claim 1, wherein said second position tracking module is a GPS engine.

4. The mobile terminal of claim 1, wherein said power availability is an existence of an external power source to said mobile terminal.

5. The mobile terminal of claim 1, wherein said power availability is a battery power level.

6. The mobile terminal of claim 1, wherein said power availability is a power consumed in a period of time.

7. The mobile terminal of claim 1, wherein said power availability is based on an expected time to obtain a GPS position fix.

8. The mobile terminal of claim 2, further comprising a transmitter for transmission of said collected code phase measurements to said remote operations center via a communication satellite.

9. The mobile terminal of claim 2, further comprising a transmitter for transmission of said collected code phase measurements to said remote operations center via a terrestrial cellular network.

10. The mobile terminal of claim 1, further comprising a transmitter for transmission of said collected measurements to said remote operations center via a short range radio network.

11. The mobile terminal of claim 1, further comprising a transmitter that transmits sensor measurements to said remote operations center.

12. A mobile terminal that enables asset tracking, comprising:

a position tracking module that collects measurements from a plurality of positioning satellites, said collected measurements being used to determine a position of said mobile terminal;

a transmitter designed for transmission of position information based on said position tracking module measurements to an operations center; and a controller that controls an activation of said transmitter based on an analysis of a geographic cost function, said geographic cost function identifying first geographic areas in which said mobile terminal can transmit at a first interval rate, and second geographic areas in which said mobile terminal can transmit at a second interval rate different from said first interval rate.

13. The mobile terminal of claim 12, wherein said first interval rate precludes any transmissions.

14. The mobile terminal of claim 12, wherein an input to said geographic cost function is a geographic location determined using said measurements of said position tracking module.

15. The mobile terminal of claim 12, wherein said transmitter transmits position information to said operations center via a communication satellite.

16. The mobile terminal of claim 12, wherein said transmitter transmits position information to said operations center via a terrestrial cellular network.

17. The mobile terminal of claim 12, wherein said transmitter transmits position information to said operations center via a short range radio network.

18. The mobile terminal of claim 12, wherein said transmitter also transmits sensor measurement information to said operations center.

* * * * *